US012726465B2

(12) United States Patent
Balin et al.

(10) Patent No.: US 12,726,465 B2
(45) Date of Patent: Sep. 1, 2026

(54) DUAL ENCRYPTED DATA STREAMS IN DISTRIBUTED SYSTEMS

(71) Applicant: Dell Products L.P., Round Rock, TX (US)

(72) Inventors: Maxim Balin, Gan-Yavne (IL); Eric Jospeh Bruno, Shirley, NY (US); Igor Dubrovsky, Beer Sheva (IL)

(73) Assignee: Dell Products L.P., Round Rock, TX (US)

( * ) Notice: Subject to any disclaimer, the term of this patent is extended or adjusted under 35 U.S.C. 154(b) by 59 days.

(21) Appl. No.: 18/901,133

(22) Filed: Sep. 30, 2024

(65) Prior Publication Data

US 2026/0095441 A1 Apr. 2, 2026

(51) Int. Cl.
*H04L 9/40* (2022.01)
*G06F 21/62* (2013.01)

(52) U.S. Cl.
CPC ...... *H04L 63/0442* (2013.01); *G06F 21/6245* (2013.01)

(58) Field of Classification Search
CPC ............ G06F 21/6209; G06F 21/6245; G06F 2221/2113; G06F 2221/2141; G08B 13/19686; H04N 21/2347; H04N 21/4318; H04N 21/4627
See application file for complete search history.

(56) References Cited

U.S. PATENT DOCUMENTS

2011/0252474 A1* 10/2011 Ward ...................... G06F 21/56 709/224
2021/0383018 A1* 12/2021 Keskikangas ....... G06F 21/6209

* cited by examiner

*Primary Examiner* — Olugbenga O Idowu
(74) *Attorney, Agent, or Firm* — WOMBLE BOND DICKINSON (US) LLP

(57) ABSTRACT

Methods and systems for managing operation of a distributed system are disclosed. The operation may be managed by securing a data stream. The data stream may be secured by a data processing system by encrypting sensitive data of the data stream to obtain a partially encrypted data stream. The partially encrypted data stream may then be encrypted by the data processing system to obtain a dual encrypted data stream. The dual encrypted data stream may be transmitted to a network security system. The network security system may decrypt the dual encrypted data stream to obtain the partially encrypted data stream. The client processing system may receive the partially encrypted data stream from the network security system and decrypt the partially encrypted data stream to obtain original content of the data stream.

20 Claims, 11 Drawing Sheets

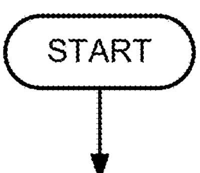

Obtain, by a client processing system of the distributed system and from a network security system of the distributed system, a potentially partially encrypted data stream originating from a data processing system of the distributed system, the network security system having access to a first decryption key to secure a potentially dual encrypted data stream.
Operation 300

DUAL ENCRYPTED DATA STREAMS IN DISTRIBUTED SYSTEMS

FIELD

Embodiments disclosed herein relate generally to managing operation of a distributed system. More particularly, embodiments disclosed herein relate to securing sensitive data in a data stream of a distributed system.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIGS. 3A-3D show flow diagrams illustrating a method in accordance with an embodiment.

DETAILED DESCRIPTION

Figure 1:
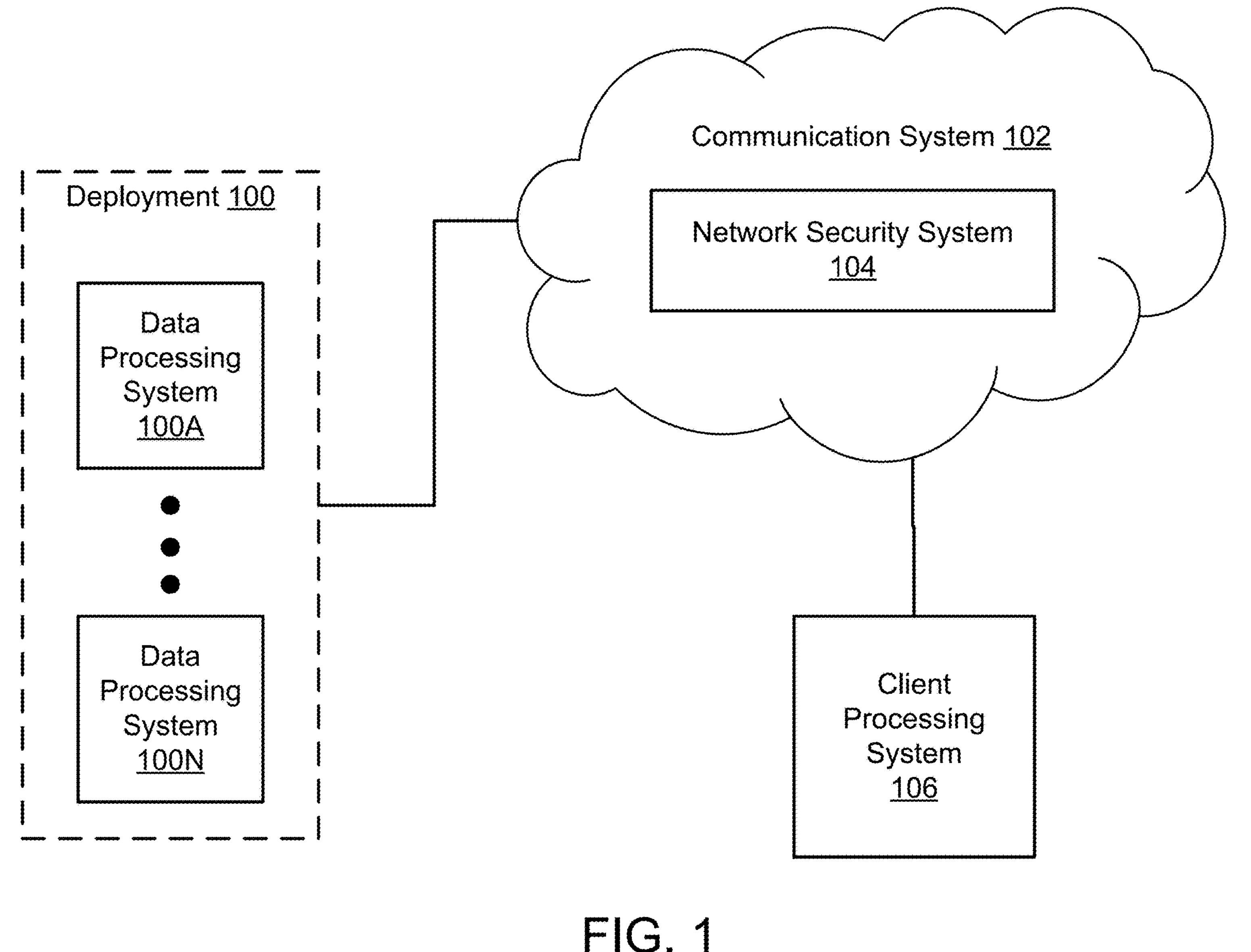
FIG. 1 shows a diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to managing operation of a distributed system. The operation may be managed by securing sensitive data in a data stream that is routed from a data processing system to a client processing system.

The sensitive data may be secured by generating, using the data stream, a dual encrypted data stream. The dual encrypted data stream may include two layers of encryption: a first layer of encryption that hides sensitive data of the dual encrypted data stream and a second layer of encryption of all data of the dual encrypted data stream.

The data processing system may store a first public key for a data encryption policy and a second public key for a communication protocol of the distributed system. The first public key may be used by the data processing system to encrypt the sensitive data of the data stream to make a partially encrypted data stream. The second public key may then be used by the data processing system to encrypt all of the data of the partially encrypted data stream to obtain the dual encrypted data stream. The dual encrypted data stream may be routed through a communication system to the client processing system.

A network security system of the communication system may receive the dual encrypted data stream. The network security system, using a private key of the communication protocol, may decrypt the dual encrypted data stream to obtain the partially encrypted data stream. After performing a security scan on the partially encrypted data stream, the network security system may transmit the partially encrypted data stream to the client processing system.

The client processing system may receive the partially encrypted data stream. Using a private key of the data encryption policy, the client processing system may decrypt the partially encrypted data stream to obtain an original content of the data stream. The original content may be ingested by an application of the client processing system to perform at least one operation. By performing the at least one operation, computer implemented services may be provided by the distributed system.

In an embodiment, a method for managing operation of a distributed system is disclosed. The method may include: (i) obtaining, by a client processing system of the distributed system and from a network security system of the distributed system, a potentially partially encrypted data stream originating from a data processing system of the distributed system, the network security system having access to a first decryption key to secure a potentially dual encrypted data stream, (ii) making, by the client processing system, a first determination regarding whether the potentially partially encrypted data stream comprises at least one portion of encrypted sensitive data; (iii) in a first instance of the first determination where the potentially partially encrypted data stream comprises the at least one portion of the encrypted sensitive data: (a) decrypting, by the client processing system and using a second decryption key, the at least one portion of the encrypted sensitive data to obtain at least one portion of sensitive data, (b) regenerating, by the client processing system, original content on which the potentially dual encrypted data stream is based using the potentially partially encrypted data stream and the at least one portion of the sensitive data, and (c) providing computer implemented services using the original content, (iv) in a second instance of the first determination where the potentially partially encrypted data stream does not comprise any encrypted sensitive data: (a) concluding that the potentially partially encrypted data stream is the original content and (b) providing computer implemented services using the original content.

The method may further comprise, before obtaining the potentially dual encrypted data stream: (i) obtaining, by the data processing system, the original content of a data stream, (ii) making, by the data processing system, a determination regarding whether at least one portion of the original content comprises sensitive data, (iii) in the first instance of a second determination where the at least one portion of the original content comprises the sensitive data: (a) encrypting, by the data processing system and using a first encryption key, the sensitive data to obtain the potentially partially encrypted data stream, (b) encrypting, by the data processing system and using a second encryption key, the potentially partially encrypted data stream to obtain the potentially dual encrypted data stream, and (c) transmitting the potentially dual encrypted data stream to the client processing system.

The original content may be data in an unaltered form before encryption using a first encryption key or a second encryption key.

The sensitive data may be private data of the original content that is subject to at least one administrative regulation.

The first decryption key may be a private key for a communication protocol that is used to secure a data stream to the client processing system and from the data processing system.

The first decryption key may be used decrypt traffic obtained by the network security system, the traffic comprising the potentially dual encrypted data stream.

The second decryption key may be a private key for a data encryption policy, the data encryption policy being used to secure sensitive data, the sensitive data to be received by the client processing system.

The second decryption key may be used in an application layer of the client processing system to decrypt the potentially partially encrypted data stream.

The network security system may not have access to the second decryption key.

The potentially dual encrypted data stream may include a first portion of chunks of data and a second portion of chunks, the first portion of chunks being dual encrypted and the second portion of chunks being singly encrypted.

Making the first determination regarding whether the potentially partially encrypted data stream includes the encrypted sensitive data may include performing a search of the potentially partially encrypted data stream to determine whether the potentially partially encrypted data stream comprises at least one chunk of sensitive data.

Potentially dual encrypted data stream may be based on a schema that defines a first encryption of sensitive data of the original content of a data stream to obtain the potentially partially encrypted data stream before a second encryption to obtain the potentially dual encrypted data stream.

The network security system may be configured to screen the potentially dual encrypted data stream for malicious data or data that does not meet security requirements of the client processing system.

The network security system may be configured to perform a decryption of the potentially dual encrypted data stream to obtain the potentially partially encrypted data stream.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a system in accordance with an embodiment is shown. The system may provide any number and types of computer implemented services (e.g., to user of the system and/or devices operably connected to the system). The computer implemented services may include, for example, data storage service, instant messaging services, etc.

To provide the computer implemented services, data may be transferred from a data processing system to a client processing system. The data may be transferred by (i) breaking down the data into at least one data packet and (ii) routing the at least one data packet in a data stream from the data processing system through a communication system to the client processing system.

The data processing system and the client processing system may use a communication protocol. The communication protocol may include an agreement that the data processing system may encrypt the data stream and a network security system of the communication system may decrypt the data stream. Following decryption of the data stream by the network security system, the client processing system may obtain the at least one data packet.

Before obtaining, by the client processing system, the at least one data packet that has been decrypted, sensitive data may be exposed in the communication system. Because the sensitive data may be exposed in the communication system, (i) at least one risk of exposure of the sensitive data may be present if a malicious user gains access to the data stream in the communication system, and/or (ii) a violation of at least one administrative regulation may occur by exposing the sensitive data. As a result of the exposure and/or the violation, computer implemented services may be impacted.

In general, embodiments disclosed here relate to systems and methods for managing operation of a distributed system. The distributed system may be managed by securing sensitive data of data in the data stream between a data processing system and a client processing system of the distributed system.

The sensitive data may be secured by adopting, by the data processing system and the client processing system, a data encryption policy in addition to a communication protocol.

First, the communication protocol may be adopted by the data processing system and the client processing system. To adopt the communication protocol, the data processing system may send a message to the client processing system. The message may include (i) at least one version of the communication protocol that is supported by the data processing system, (ii) a session identification for use of the communication protocol, (iii) at least one first cryptographic algorithm supported by the data processing system, etc. The client processing system may (i) receive the message from the data processing system, (ii) select a version of the at least one version of the communication protocol to adopt, (iii) record the session identification, and/or (iv) select a first cryptographic algorithm.

Using the first cryptographic algorithm, the client processing system may generate a communication protocol encryption key and a communication protocol decryption key. The communication protocol encryption key may be transferred to the data processing system and the communication protocol decryption key may be transferred to a network security system of a communication system between the data processing system and the client processing system. The data processing system may use the communication protocol encryption key to encrypt at least one data packet to be sent in a data stream to the client processing system. The network security system may use the communication protocol decryption key to decrypt the at least one data packet in the data stream before sending the at least one data packet to the client processing system.

To secure sensitive data of the at least one data packet in the data stream, the client processing system may adopt a data encryption policy. To adopt the data encryption policy, the client processing system may select a second cryptographic algorithm that is supported by the data processing system. A data encryption policy encryption key and a data encryption policy decryption key may be generated by the client processing system. The client processing system may store the data encryption policy decryption key and may transfer the data encryption policy encryption key to the data processing system.

The data processing system may obtain, by an administrator, an application, etc., the data in an original format. The data may include the sensitive data. The sensitive data may include personal data that may be required, by at least one administrative regulation, to be encrypted and/or unreadable in the data. The data processing system may identify the sensitive data of the data by performing a search, by an administrator, an artificial intelligence model, etc. for the sensitive data. A location of the sensitive data may be recorded in metadata that is associated with the data. Then, the data processing system may encrypt, using the data encryption policy encryption key, at least one chunk of the data that is the sensitive data, to obtain partially encrypted data.

The partially encrypted data may be transferred to the client processing system. The partially encrypted data may be transferred by (i) breaking down the partially encrypted data into at least one partially encrypted data packet, (ii) encrypting, using the communication protocol encryption key, the at least one partially encrypted data packet to obtain at least one dual encrypted data packet, and/or (iii) routing the at least one dual encrypted data packet through the communication system to the client processing system.

The at least one dual encrypted data packet may be received by the network security system. The network security system may decrypt, using the communication protocol decryption key, the at least one dual encrypted data packet to obtain the at least one partially encrypted data packet. The network security system may perform a security scan of the at least one partially encrypted data packet. The security scan may include (i) a header inspection (for example, a confirmation of source and destination internet protocol (IP) addresses, port scanning, etc.), (ii) data packet inspection (for malware, viruses, SQL injections, etc.), (iii) rate limiting inspections (for denial-of-service attacks, etc.), etc. Once the security scan is completed, the network security system may transfer the at least one partially encrypted data packet to the client processing system.

The client processing system may receive the at least one partially encrypted data packet and decrypt the at least one chunk of the at least one partially encrypted data. The client processing system may decrypt the at least one chunk, using the data encryption policy decryption key, by (i) performing the search in the metadata of the at least one partially encrypted data for the at least one location of the sensitive data of the data, and (ii) decrypting the sensitive data at the at least one location to obtain the data in the original format. The data in the original format, once obtained by the client processing system, may be ingested by at least one application of the client processing system.

By adopting, by the distributed system, the data encryption policy, sensitive data of the data may be encrypted while being routed from the data processing system to the client processing system. While encrypted from the data processing system to the client processing system, a risk of exposure of the sensitive data may be alleviated. By alleviating the risk of the exposure, desired computer implemented services may be provided by the distributed system.

To provide the above noted functionality, the system may include deployment 100, and client processing system 106. Each of these components is discussed below.

Deployment 100 may include any number of data processing system 100A-100N. The any number of data processing system 100A-100N may transfer data to client processing system 106. The any number of data processing system 100A-100N may transfer data by routing the data though communication system 102 to client processing system 106. The any number of data processing system 100A-100N may encrypt at least one chunk of the data using a data encryption policy encryption key to obtain partially encrypted data. The at least one chunk of the data may include sensitive data. The sensitive data may include personal data that may be required, by at least one administrative regulation, to be encrypted and/or unreadable.

To further prepare transfer of the data, the any number of data processing system 100A-100N may (i) break down the partially encrypted data into at least one partially encrypted data packet, (ii) encrypt, using a communication protocol encryption key, the at least one partially encrypted data packet to obtain at least one dual encrypted data packet, and/or (iii) route the at least one dual encrypted data packet through the communication system to the client processing system.

The at least one dual encrypted data packet may be received by a network security system of communication system 102. The network security system may decrypt, using a communication protocol decryption key, the at least one dual encrypted data packet to obtain the at least one partially encrypted data packet. The network security system may perform a security scan of the at least one partially encrypted data packet. The security scan may include (i) a header inspection (confirmation of source and destination internet protocol (IP) addresses, port scanning, etc.), (ii) data packet inspection (for malware, viruses, SQL injections, etc.), (iii) rate limiting inspections (for denial-of-service attacks, etc.), etc. Once the security scan is completed, the network security system may transfer the at least one partially encrypted data packet to client processing system 106.

Client processing system 106 may receive the at least one partially encrypted data packet and decrypt the at least one chunk of the at least one partially encrypted data packet. Client processing system 106 may decrypt the at least one chunk, using a data encryption policy decryption key stored by client processing system 106, by (i) performing the search in the metadata of the at least one partially encrypted data packet for the at least one location of the sensitive data of the data, and (ii) decrypting the sensitive data at the at least one location to obtain the data in an original format. The data in the original format, once obtained by client processing system 106, may be ingested by at least one application of client processing system 106.

While providing their functionality, any of deployment 100 and client processing system 106 may perform all, or a portion, of the flows and methods shown in FIGS. 2A-3D.

Any of (and/or components thereof) deployment 100 and client processing system 106 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 102. In an embodiment, communication system 102 includes one or more networks that facilitate communication between any number of components. The networks may include wired networks and/or wireless networks (e.g., and/or the Internet). The networks may operate in accordance with any number and types of communication protocols (e.g., such as the Internet protocol).

While illustrated in FIG. 1 as including a limited number of specific components, a system in accordance with an embodiment may include fewer, additional, and/or different components than those components illustrated therein.

To further clarify embodiments disclosed herein, interactions diagrams in accordance with an embodiment are shown in FIGS. 2A-2B, and 2D-2E. These interactions diagrams may illustrate how data may be obtained and used within the system of FIGS. 2A-2B, and 2D-2E.

In the interaction diagrams, processes performed by and interactions between components of a system in accordance with an embodiment are shown. In the diagrams, components of the system are illustrated using a first set of shapes (e.g., 100A, 104, etc.), located towards the top of each figure. Lines descend from these shapes. Processes performed by the components of the system are illustrated using a second set of shapes (e.g., 200, 206, etc.) superimposed over these lines. Interactions (e.g., communication, data transmissions, etc.) between the components of the system are illustrated using a third set of shapes (e.g., 202, 204, etc.) that extend between the lines. The third set of shapes may include lines terminating in one or two arrows. Lines terminating in a single arrow may indicate that one way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the process labeled as 200 may occur prior to the process labeled as 206. However, it will be appreciated that the processes and interactions may be performed in different orders, any may be omitted, and other processes or interactions may be performed without departing from embodiments disclosed herein.

Figure 2A:
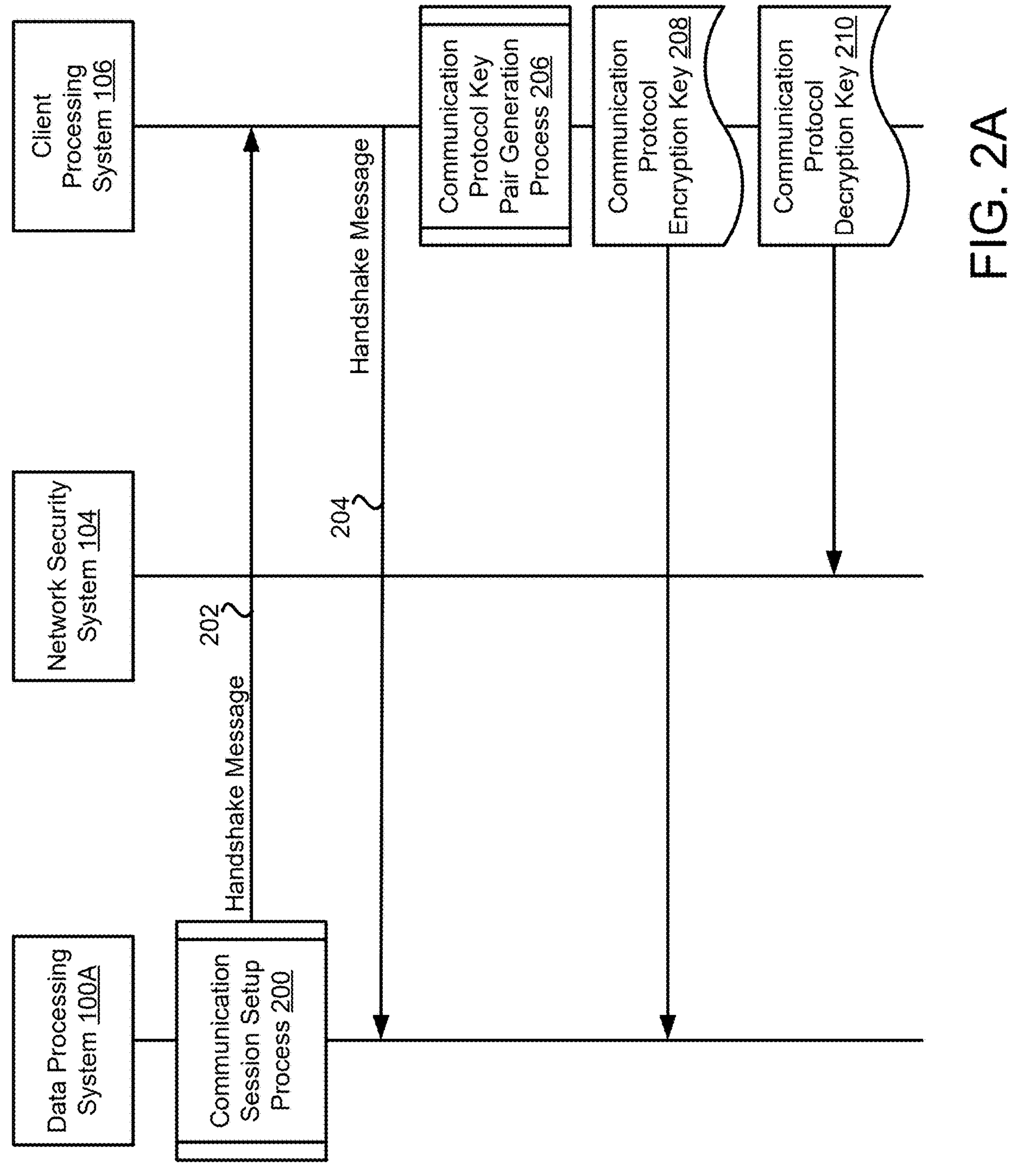
FIGS. 2A-2B and 2D-2E show interaction diagrams illustrating operation of a system in accordance with an embodiment.

Turning to FIG. 2A, a first interaction diagram in accordance with an embodiment is shown. The first interaction diagram may illustrate data used in and data processing performed in generating and transferring a communication protocol encryption key and a communication protocol decryption key.

To generate and transfer the communication protocol encryption key and the communication protocol decryption key, communication session setup process 200 may be performed. During communication session setup process 200, data processing system 100A may resolve an address (e.g., an internet protocol (IP) address) by which to establish communication with client processing system 106. Data processing system 100A may resolve the address by obtaining the address from (i) a domain name of client processing system 106 and/or (ii) a repository of addresses within deployment 100.

Once the address has been resolved, data processing system 100A may send a first message (e.g., 202) to client processing system 106. The first message may be sent using, for example, a data stream, message queue, and/or shared memory. The first message may include (i) at least one version of the communication protocol that is supported by data processing system 100A, (ii) a session identification for use of the communication protocol, (iii) at least one cryptographic algorithm supported by client processing system 106, etc.

Client processing system 106 may (i) receive the first message from client processing system 106, (ii) select a version of the at least one version of the communication protocol to employ, (iii) record the session identification, and/or (iv) select a first cryptographic algorithm of at least the one cryptographic algorithm listed in the first message.

Once the communication protocol has been selected, the session identification has been recorded, and/or the first cryptographic algorithm has been selected, client processing system 106 may send a second message (e.g., 204) to data processing system 100A. The second message may be sent using, for example, a data stream, message queue, and/or shared memory. The second message may include (i) the version of the communication protocol selected by client processing system 106, (ii) confirmation of the session identification, and/or (iii) the first cryptographic algorithm selected by client processing system 106.

Once the communication protocol has been established between data processing system 100A and client processing system 106, communication protocol key pair generation process 206 may be performed. During communication protocol key pair generation process 206, a public key and a private key may be generated by client processing system 106. The private key may be generated using, for example, a random number generator. The public key may be generated using, for example, a mathematical algorithm and/or the private key. The public key may be used for an encryption process and the private key may be used for a decryption process. The public key may include communication protocol encryption key 208 and the private key may include communication protocol decryption key 210.

Client processing system 106 may transfer communication protocol encryption key 208 to data processing system 100A. Communication protocol encryption key 208 may be transferred using, for example, a data stream, message queue, and/or shared memory. Similarly, communication protocol decryption key 210 may be sent to network security system 104. Communication protocol decryption key 210 may be transferred using, for example, a data stream, message queue, and/or shared memory.

Thus, via the interaction illustrated in FIG. 2A, a system in accordance with an embodiment may generate and transfer the communication protocol encryption key and the communication protocol decryption key. Consequently, a deployment (e.g., 100) may be more likely to be able to provide desired computer implemented services by generating an encryption key and a decryption key by which to encrypt and decrypt, respectively, a data stream sent from a data processing system (e.g., 100A) to a client processing system (e.g., 106) through a network security system (e.g., 104).

Figure 2B:
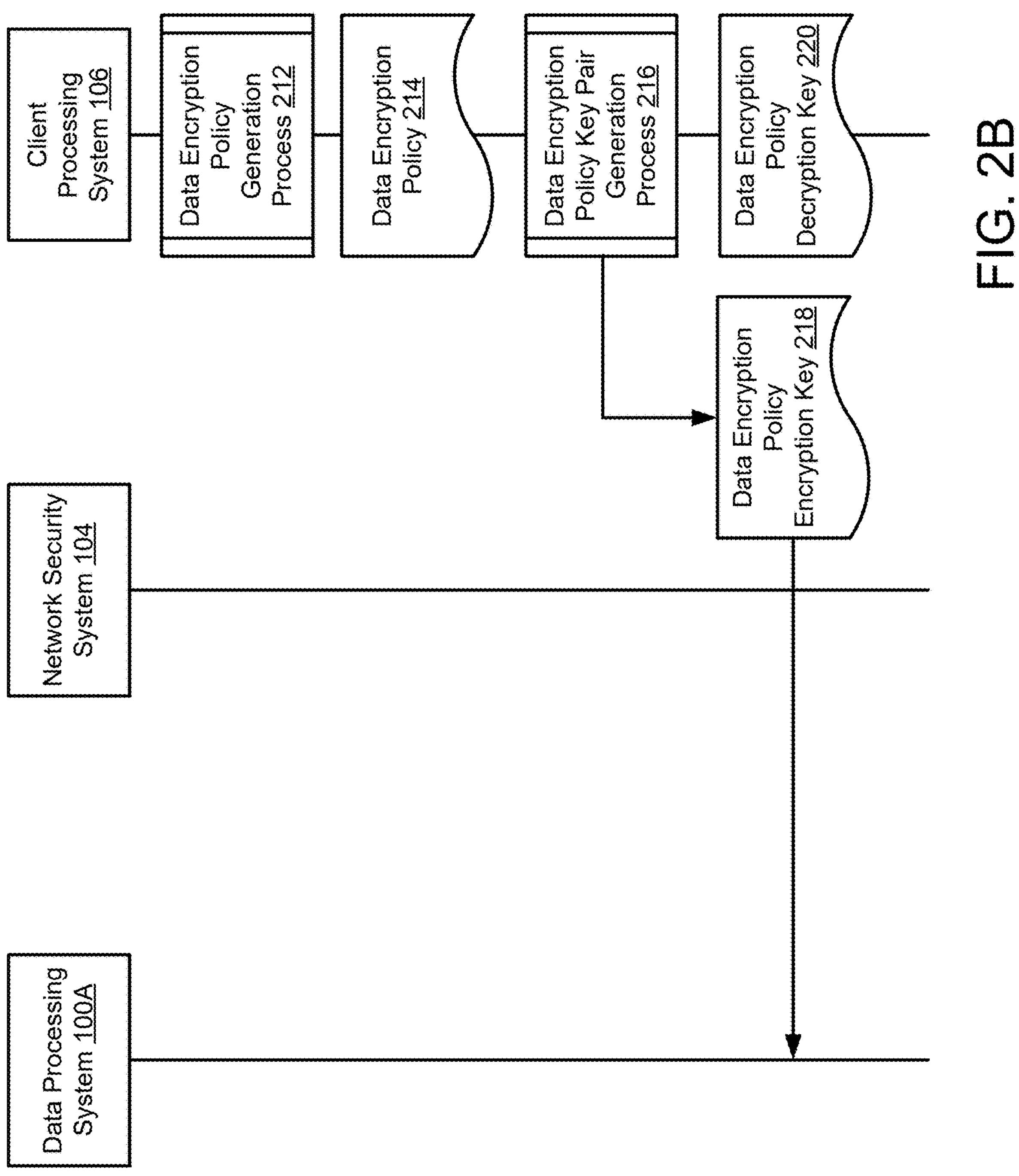

Turning to FIG. 2B, a second interaction diagram in accordance with an embodiment is shown. The second interaction diagram may illustrate data used in and data processing performed in generating and transferring a data encryption policy encryption key and a data encryption policy decryption key.

To generate and transfer the data encryption policy encryption key and the data encryption policy decryption key, data encryption policy generation policy 212 may be performed. During data encryption policy generation policy 212, a second cryptographic algorithm may be selected by from the at least one cryptographic algorithm from the first message (e.g., 202). The second cryptographic algorithm may be used to encrypt sensitive data in the data that is transferred from data processing system 100A to client processing system 106. The sensitive data may include personal data that may be required, by at least one administrative regulation, to be encrypted and/or unreadable. Data encryption policy 214 used to encrypt the sensitive data may include the second cryptographic algorithm.

Using data encryption policy 214, data encryption policy key pair generation 216 may be performed. During data encryption policy key pair generation 216, a second public key and a second private key may be generated by client processing system 106. The second private key may be generated using, for example, a random number generator. The second public key may be generated using, for example, a mathematical algorithm and/or the second private key. The second public key may be used for a second encryption process and the second private key may be used for a second decryption process. The public key may include data encryption policy encryption key 218 and the second private key may include data encryption policy decryption key 220.

Client processing system 106 may transfer data encryption policy encryption key 218 to data processing system 100A. Data encryption policy encryption key 218 may be transferred using, for example, a data stream, message queue, and/or shared memory. In addition, data encryption policy decryption key 220 may be stored in client processing system 106.

Thus, via the interaction illustrated in FIG. 2B, a system in accordance with an embodiment may generate and transfer the data encryption policy encryption key and the data encryption policy decryption key. Consequently, a deployment (e.g., 100) may be more likely to be able to provide desired computer implemented services by generating a second encryption key and a second decryption key with which to encrypt and decrypt, respectively, sensitive data in traffic sent from a data processing system (e.g., 100A) to a client processing system (e.g., 106) through a network security system (e.g., 104).

Figure 2C:
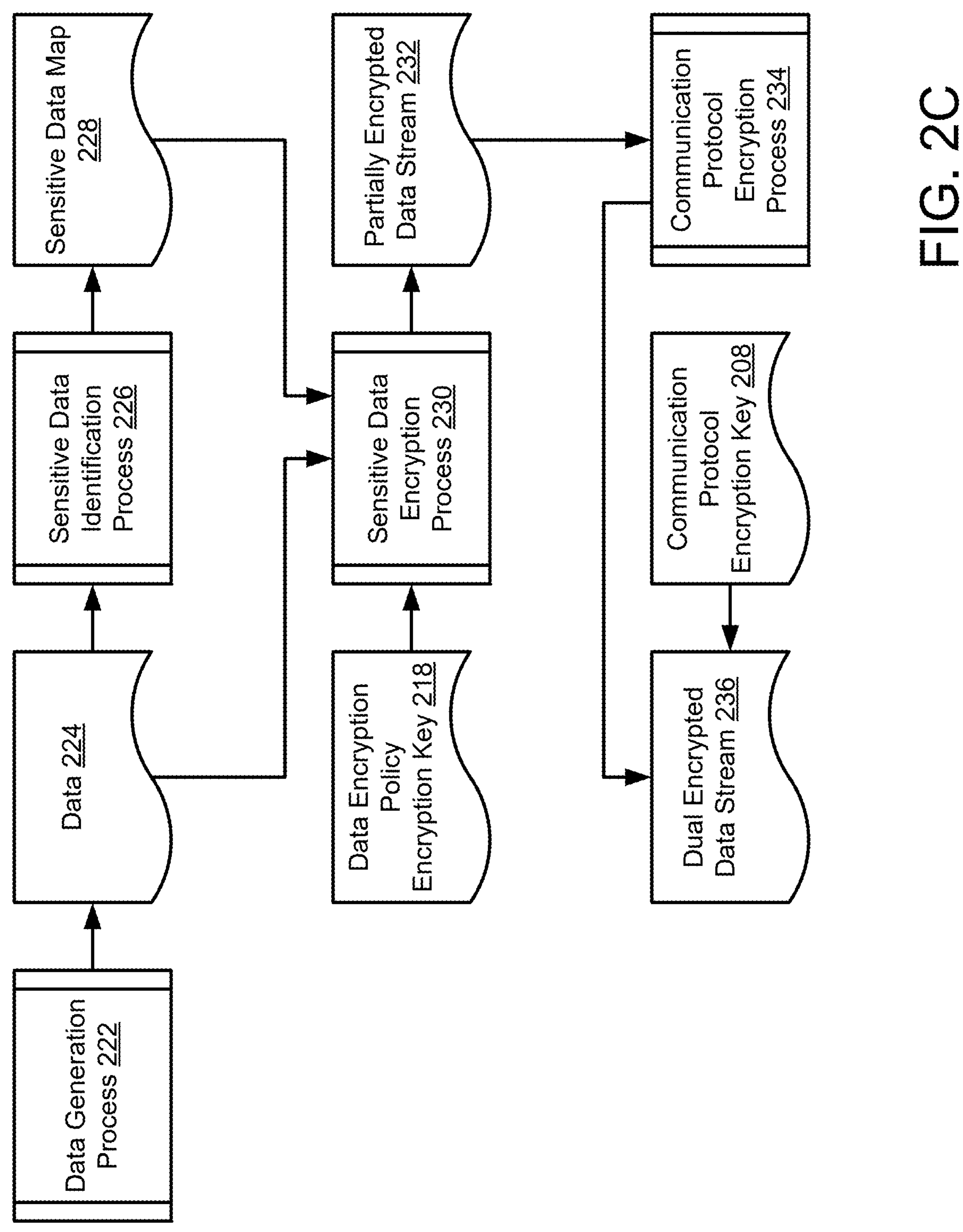
FIG. 2C shows a data flow diagram illustrating operation of a system in accordance with an embodiment.

To further clarify embodiments disclosed herein, a data flow diagram in accordance with an embodiment is shown in FIG. 2C. In this diagram, flows of data and processing of data are illustrated using different sets of shapes. A first set of shapes (e.g., 224, 228, etc.) is used to represent data structures and a second set of shapes (e.g., 222, 226, etc.) is used to represent processes performed using and/or that generate data.

Turning to FIG. 2C, a first data flow diagram in accordance with an embodiment is shown. The first data flow diagram may illustrate data used in and data processing performed in generating a dual encrypted data stream.

To generate the dual encrypted data stream, data generation process 222 may be performed. During data generation process 222, data may be obtained by data processing system 100A. The data may be obtained by (i) receiving the data from an administrator, (2) generating, using software of data processing system 100A, the data, and/or (iii) extracting the data from a repository of data processing system 100A.

Data 224 may include the data that is received, generated, and/or extracted. Data 224 may include sensitive data. The sensitive data may include personal data that may be required, by at least one administrative regulation, to be encrypted and/or unreadable. To render as encrypted and/or unreadable the sensitive data in the data, sensitive data identification process 226 may be performed.

During sensitive data identification process 226, a search may be performed by, for example, the administrator of data processing system 100A and/or an artificial intelligence model, for the sensitive data. The sensitive data may include (i) names, (ii) social insurance numbers, (iii) individual health data, etc. The artificial intelligence model may have been trained using at least one example of the sensitive data to identify the sensitive data in the data.

From performance of the search, sensitive data map 228 may be generated, for example, by the administrator and/or the artificial intelligence model. Sensitive data map 228 may include at least one location of the sensitive data in the data. The at least one location may be listed by, for example, line number and/or character number in the line number of the data.

Using sensitive data map 228 and data 224, sensitive data encryption process 230 may be performed. During sensitive data encryption process 230, the sensitive data of the data may be located using sensitive data map 228. For example, the administrator and/or a second artificial intelligence model may ingest a first location of sensitive data map 228 to find a first character set of sensitive data in the data. Once the first character set in the data has been found, the first character set may be extracted to obtain a copy of the first character set. The copy of the first character set may be encrypted using data encryption policy encryption key 218 to obtain an encrypted copy of the first character set. The encrypted copy of the first character set may be written in the first location, overwriting the first character set.

During sensitive data encryption process 230, as described in the previous paragraph, at least one character set of the sensitive data may be overwritten by the encrypted copy of the at least one character set of the sensitive data. As a result, partially encrypted data stream 232 may be obtained.

To prepare for routing of partially encrypted data stream 232 as traffic though communication system 102 to client processing system 106, communication protocol encryption process 234 may be performed. During communication protocol encryption process 234, partially encrypted data stream 232 may be encrypted using communication protocol encryption key 208 to obtain dual encrypted data stream 236. To obtain dual encrypted data stream 236, partially encrypted data stream 232 may be broken down into at least one partially encrypted data packet. The at least one partially encrypted data packet may be encrypted, using communication protocol encryption key 208, to obtain at least one dual encrypted data packet of dual encrypted data stream 236.

Thus, via the data flow illustrated in FIG. 2C, a system in accordance with an embodiment may generate the dual encrypted data stream. Consequently, a deployment (e.g., 100) may be more likely to be able to provide desired computer implemented services by generating a data stream with sensitive data that is doubly encrypted.

Figure 2D:
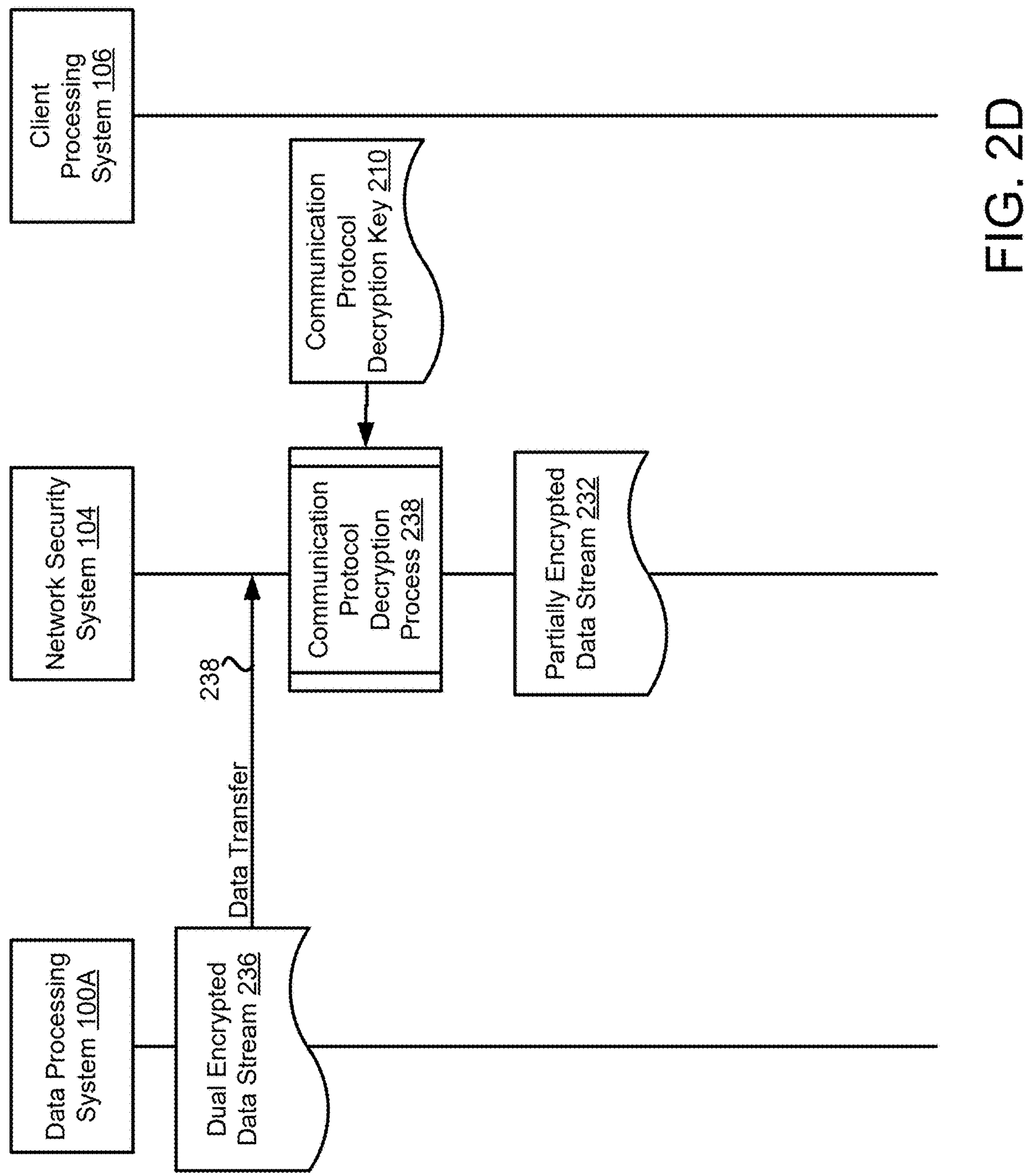

Turning to FIG. 2D, a third interaction diagram in accordance with an embodiment is shown. The third interaction diagram may illustrate data used in and data processing performed in generating, by a network security system, a partially encrypted data stream.

To generate, by the network security system, the partially encrypted data stream, network security system 104 may receive dual encrypted data stream 236. Dual encrypted data stream 236 may be received through a data transfer (e.g., 238). The data transfer may be facilitated using, for example, a data stream, message queue, and/or shared memory.

Once dual encrypted data stream 236 is received by network security system 104, communication protocol decryption process 238 may be performed. During communication protocol decryption process 238, dual encrypted data stream 236 may be encrypted using communication protocol decryption key 210. Dual encrypted data stream 236 may be decrypted by transforming dual encrypted data stream 236 from a ciphertext format to a plaintext format to obtain partially encrypted data stream 232.

Partially encrypted data stream 232 may include chunks of data that are stored in a ciphertext format. The chunks of the data may include the sensitive data of partially encrypted data stream 232.

Thus, via the interaction illustrated in FIG. 2D, a system in accordance with an embodiment may generate, by the network security system, the partially encrypted data stream. Consequently, a deployment (e.g., 100) may be more likely to be able to provide desired computer implemented services by maintaining an encryption of sensitive data in a data stream after decryption of a data stream from a data processing system to the network security system.

Figure 2E:
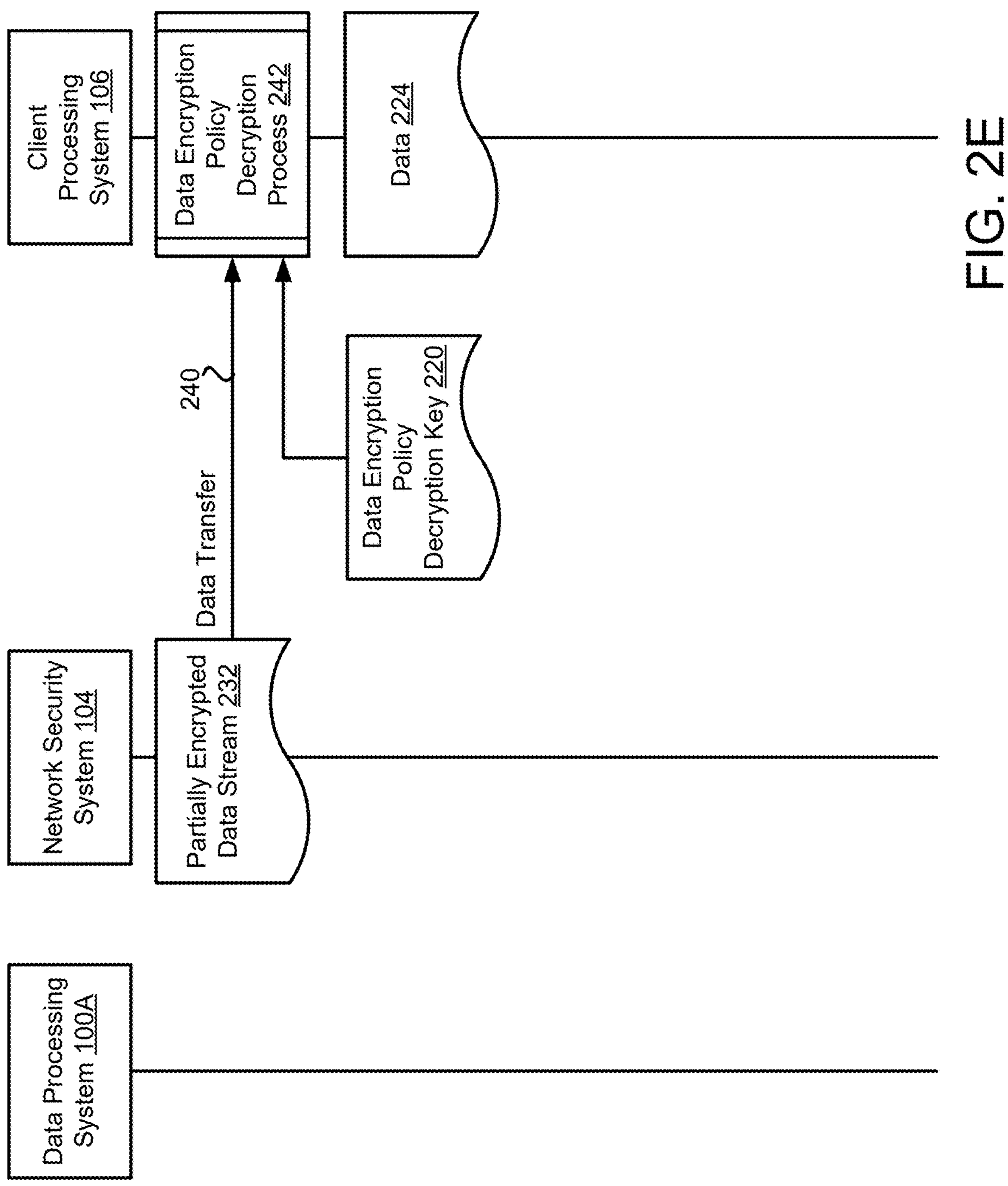

Turning to FIG. 2E, a fourth interaction diagram in accordance with an embodiment is shown. The fourth interaction diagram may illustrate data used in and data processing performed in generating, by a client processing system, data from a partially encrypted data stream.

To generate, by client processing system 106, data 224 from partially encrypted data stream 232, data encryption policy decryption process 242 may be performed. During data encryption policy decryption process 242, client processing system 106 may read metadata of partially encrypted data stream 232. During the reading of the metadata, client processing system 106 may perform a search for at least one keyword in the metadata. The keyword may include, as a value of the keyword, at least one line number and/or at least one character number of the at least one line number of at least one encrypted character set. On the at least one encrypted character set, a decryption, using data encryption policy decryption key 220, may be performed. During the decryption, a format of the encrypted character set may be transformed from ciphertext to plaintext. As a result of the decryption on the at least one encrypted character set, data 224 may be obtained. Data 224 may be ingested by at least one application of client processing system 106 to perform an operation and therefore provide computer implemented services.

Thus, via the interaction illustrated in FIG. 2E, a system in accordance with an embodiment may generate, by the client processing system, the data from the partially encrypted data stream. Consequently, a deployment (e.g., 100) may be more likely to be able to provide desired computer implemented services by performing a decryption of sensitive data by the client processing system to obtain the data for use in at least one application of the client processing system.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Figure 3B:
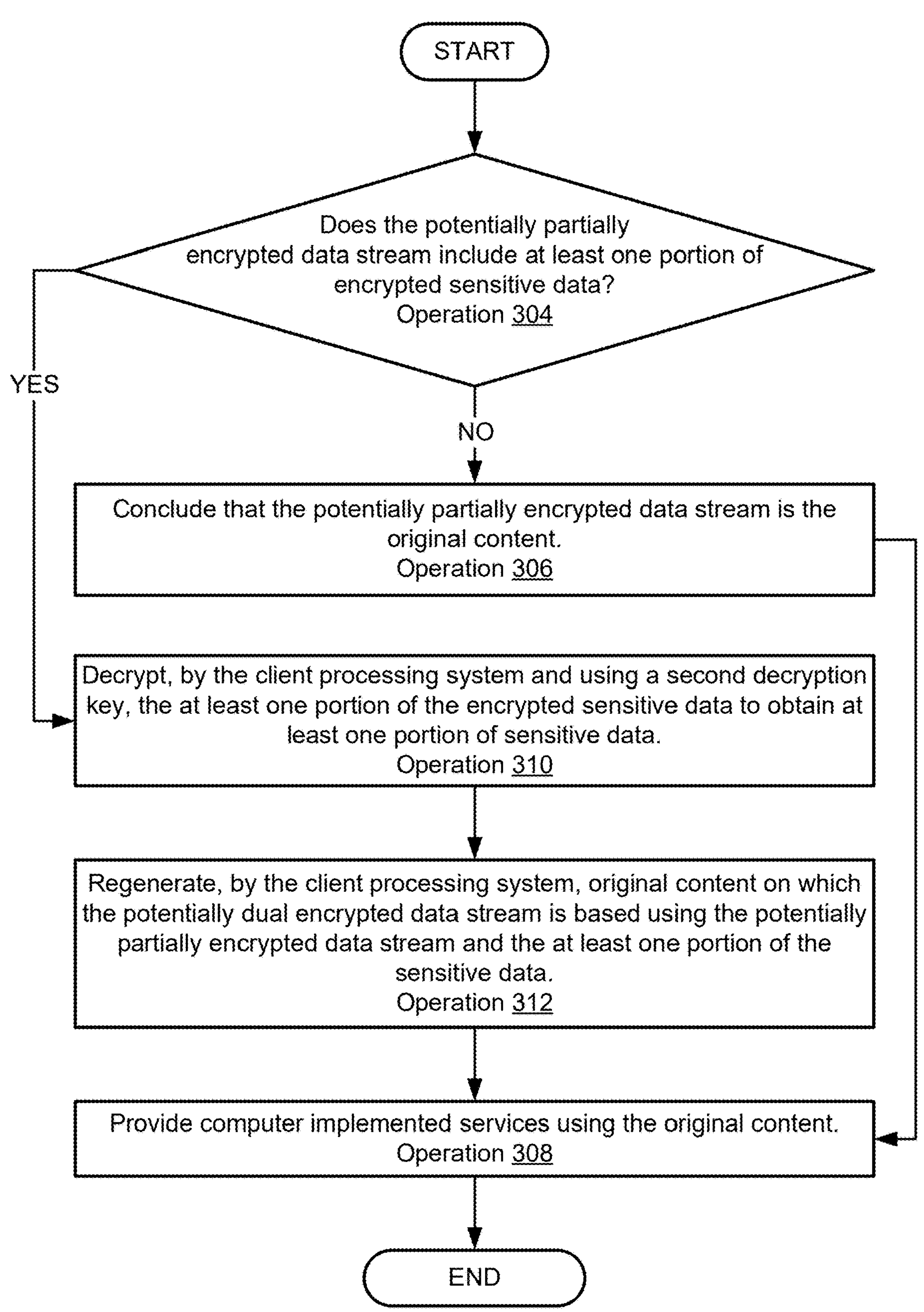

As discussed above, the components of FIG. 1 may perform various methods to manage data processing systems. FIGS. 3A-3B illustrate a method that may be performed by the components of the system of FIG. 1. In the diagram discussed below and shown in FIGS. 3A-3B, any of the operations may be repeated, performed in different orders, and/or performed in parallel with or in a partially overlapping in time manner with other operations.

Turning to FIG. 3A, a flow diagram illustrating a method of managing operation of a distributed system in accordance with an embodiment is shown. The method may be performed, for example, by any of the components of the system of FIG. 1, and/or other components not shown therein.

At operation 300, a potentially partially encrypted data stream may be obtained, by a client processing system of the distributed system and from a network security system of the distributed system, the potentially partially encrypted data stream originating from a data processing system of the distributed system, the network security system having access to a first decryption key to secure a potentially dual encrypted data stream. The potentially partially encrypted data stream may be obtained by receiving, by the client processing system and from the network security system, the potentially partially encrypted data stream.

Turning to FIG. 3B, at operation 304, a determination may be made regarding whether the potentially partially encrypted data stream includes encrypted sensitive data. The determination may be made by performing a search of the potentially partially encrypted data stream to determine whether the potentially partially encrypted data stream includes at least one portion of encrypted sensitive data. The search may be performed extracting, from the metadata, at least one location of the at least one portion of the encrypted sensitive data in the potentially partially encrypted data stream.

If the potentially partially encrypted data stream includes the at least one portion of the encrypted sensitive data, then the method may continue at operation 310. Otherwise, if the potentially partially encrypted data stream does not include the at least one portion of the encrypted sensitive data, then the method may continue at operation 306.

At operation 306, the potentially partially encrypted data stream may be concluded to include the original content. The potentially partially encrypted data stream may be concluded to include the original content by determining, from the search of the metadata, that the at least one portion of the encrypted sensitive data sensitive data is not present in the potentially partially encrypted data stream.

At operation 308, computer implemented services may be provided using the original content. Computer implemented services may be provided by ingesting, by an application of the client processing system, the original content to perform at least one operation that provides the computer implemented services.

Turning to operation 304, at operation 310, the at least one portion of the encrypted sensitive data may be decrypted, by the client processing system and using a second decryption key, to obtain at least one portion of sensitive data. The at least one portion of the encrypted sensitive data may be decrypted by converting ciphertext of the at least one portion of the encrypted sensitive data to plaintext of the at least one portion of the sensitive data.

At operation 312, the original content, on which the potentially dual encrypted data stream is based using the potentially partially encrypted data stream and the at least one portion of sensitive data, may be regenerated by the client processing system. The original content may be regenerated by replacing the ciphertext of the potentially partially encrypted data stream with the plaintext to obtain the original content.

At operation 308, computer implemented services may be provided using the original content. Computer implemented services may be provided by ingesting, by an application of the client processing system, the original content to perform at least one operation that provides the computer implemented services.

The method may end following operation 308.

Thus, via the method shown in FIGS. 3A-3B, embodiments herein may likely improve a likelihood of managing the operation of the distributed system. By improving the likelihood of managing the operation of the distributed system, the data processing systems may be more likely to provide desirable computer implemented services by, for example, obtaining sensitive data that has been encrypted in a data stream, performing a decryption of the at least one portion of the encrypted sensitive data in the data stream, etc.

Figure 3C:
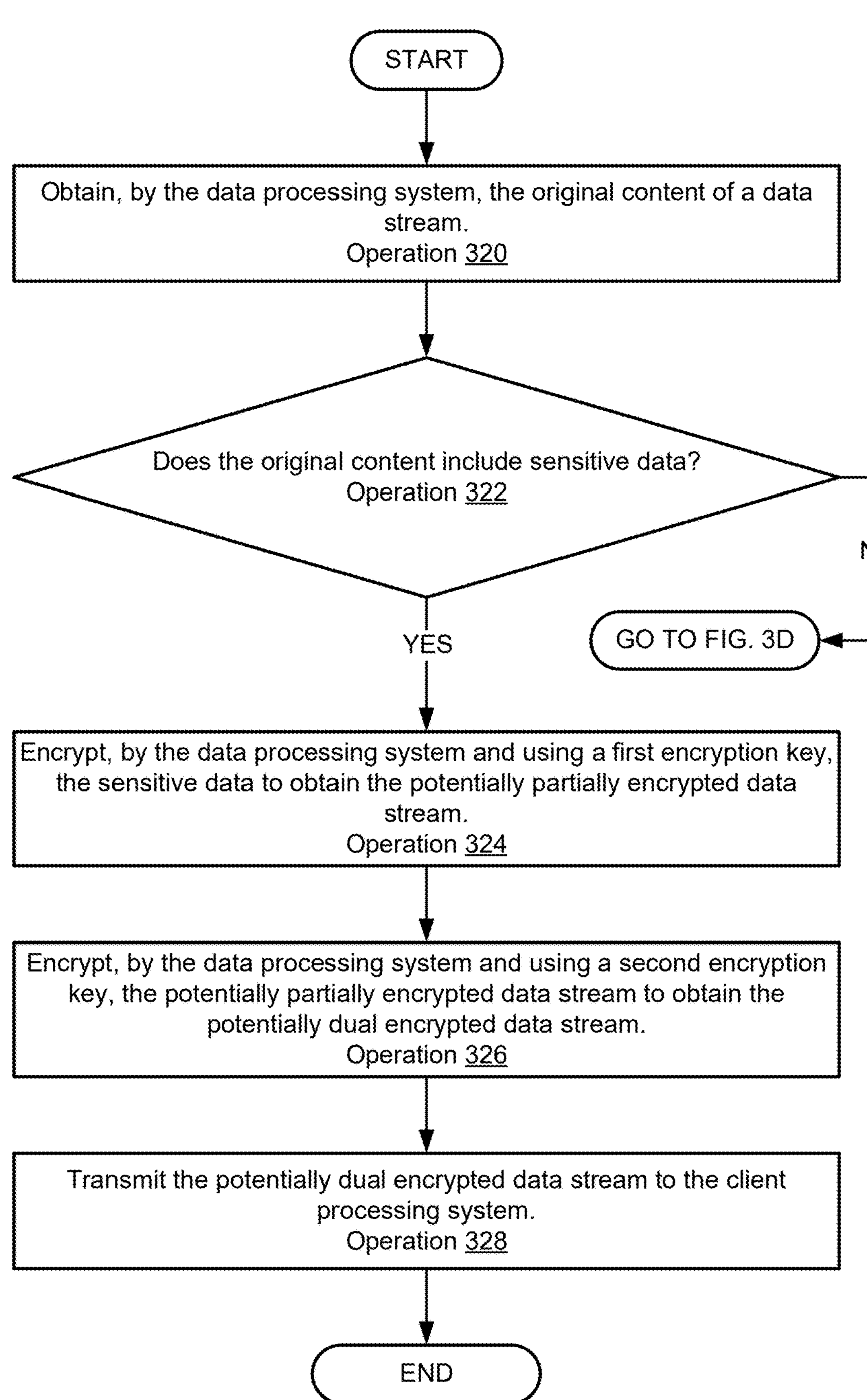
Figure 3D:
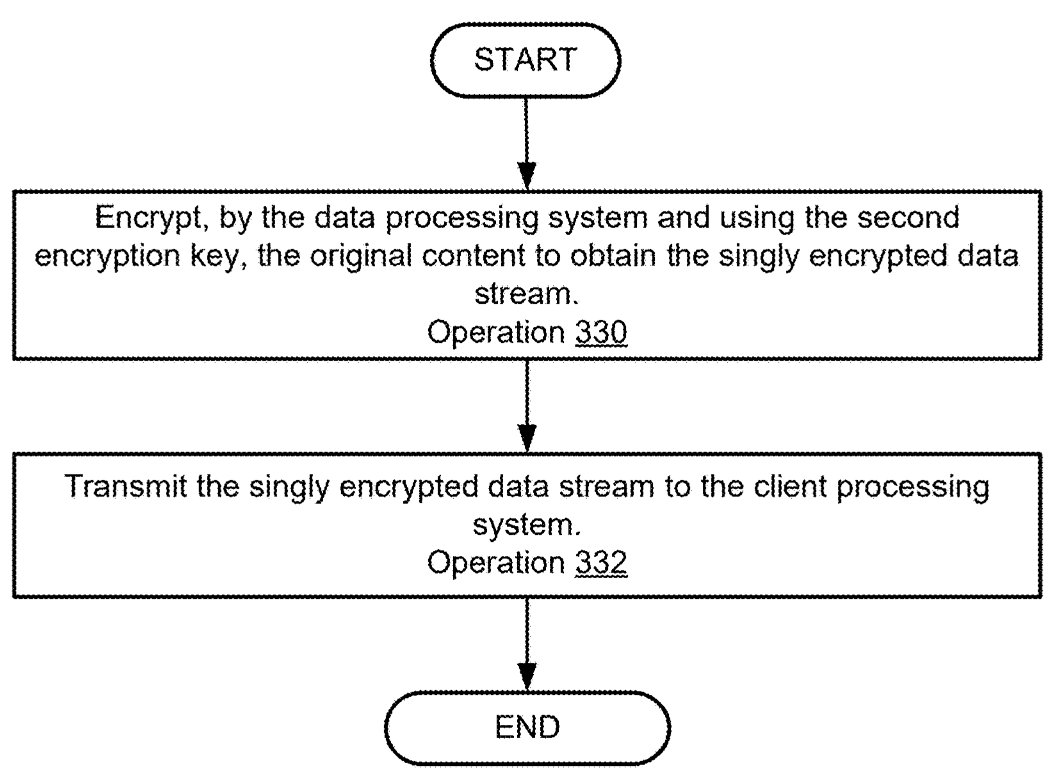

As discussed above, the components of FIG. 1 may perform various methods to manage data processing systems. FIGS. 3C-3D illustrate a method that may be performed by the components of the system of FIG. 1. In the diagram discussed below and shown in FIGS. 3C-3D, any of the operations may be repeated, performed in different orders, and/or performed in parallel with or in a partially overlapping in time manner with other operations.

Turning to FIG. 3C, a flow diagram illustrating a method of managing operation of a distributed system in accordance with an embodiment is shown. The method may be performed, for example, by any of the components of the system of FIG. 1, and/or other components not shown therein.

At operation 320, original content of a data stream may be obtained by a data processing system. The original content may be obtained by receiving the original content from an administrator, an application, etc.

At operation 322, a determination may be made regarding whether the original content includes sensitive data. The determination may be made by, for example, the administrator and/or an artificial intelligence model that performs a search of the original content for sensitive data. After at least one portion of the sensitive data has been found, a location in the original content of the sensitive data may be recorded in metadata that is associated with the original content.

If the original content includes sensitive data, then the method may continue at operation 324. Otherwise, if the original content does not include sensitive data, then the method may continue at operation 330 in FIG. 3D.

At operation 324, the sensitive data of the original content may be encrypted, by the data processing system and using a first encryption key, to obtain a potentially partially encrypted data stream. The sensitive data of the original content may be encrypted by converting, using the first encryption key, the sensitive data from plaintext to ciphertext.

At operation 326, the potentially partially encrypted data stream may be encrypted, by the data processing system and using a second encryption key, to obtain a potentially dual encrypted data stream. The potentially partially encrypted data stream may be encrypted by breaking down the potentially partially encrypted data stream into at least one potentially partially encrypted data packet and encrypting, using the second encryption key, the at least one potentially partially encrypted data packet to obtain the potentially dual encrypted data stream.

At operation 328, the potentially dual encrypted data stream may be transmitted to the client processing system. The potentially dual encrypted data stream may be transmitted by routing the potentially dual encrypted data stream through a communication system, that includes a network security system.

The method may end following operation 328.

Turning to operation 322, the method may continue in FIG. 3D. At operation 330, the original content may be encrypted, by the data processing system and using the second encryption key, to obtain a potentially singly encrypted data stream. The original content may be encrypted by breaking down the original content into at least one data packet of the original content and encrypting, using the second encryption key, the at least one data packet of the original content to obtain the potentially singly encrypted data stream.

At operation 332, the potentially singly encrypted data stream may be transmitted to the client processing system. The potentially singly encrypted data stream may be transmitted by routing the potentially singly encrypted data stream through a communication system, that includes the network security system.

Thus, via the method shown in FIGS. 3C-3D, embodiments herein may likely improve a likelihood of managing the operation of the distributed system. By improving the likelihood of managing the operation of the distributed system, the data processing systems may be more likely to provide desirable computer implemented services by, for example, encrypting sensitive data of original content obtained by the data processing system, generating the potentially dual encrypted data stream, the potentially dual encrypted data stream that includes the sensitive data that is doubly encrypted, etc.

Figure 4:
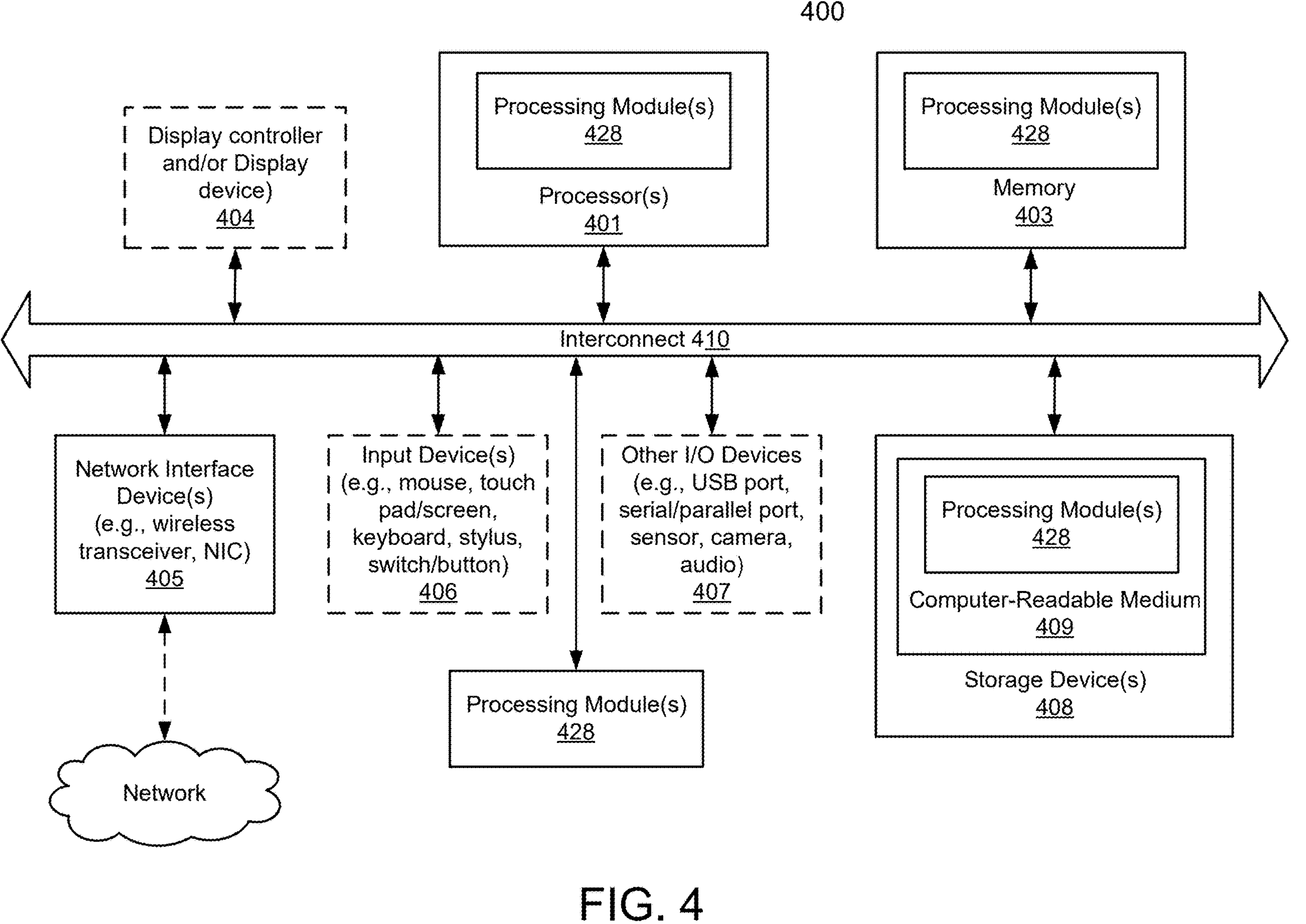
FIG. 4 shows a block diagram illustrating a data processing system in accordance with an embodiment.

Any of the components illustrated in FIGS. 1-2E may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a distributed system, the method comprising:

obtaining, by a data processing system of the distributed system, original content of a data stream;

encrypting, by the data processing system and using a first encryption key, sensitive data of the original content to obtain a partially encrypted data stream;

encrypting, by the data processing system and using a second encryption key, an entirety of the partially encrypted data stream to obtain a dual encrypted data stream such that the dual encrypted data stream comprises a first portion of chunks of data being dual encrypted and a second portion of chunks being singly encrypted;

transmitting the dual encrypted data stream to a network security system of the distributed system, the network security system having access to a first decryption key that is used to decrypt the dual encrypted data stream to obtain the partially encrypted data stream;

obtaining, by a client processing system of the distributed system and from the network security system of the distributed system, the partially encrypted data stream;

decrypting, by the client processing system and using a second decryption key, the partially encrypted data stream obtain at least one portion of the sensitive data;

regenerating, by the client processing system, a portion of the original content on which the dual encrypted data stream is based using the partially encrypted data stream and the at least one portion of the sensitive data; and providing computer implemented services using the portion of the original content.

2. The method of claim 1, wherein the original content is data in an unaltered form before encryption using the first encryption key or the second encryption key.

3. The method of claim 2, wherein the sensitive data is private data of the original content that is subject to at least one administrative regulation.

4. The method of claim 1, wherein the first decryption key is a private key for a communication protocol that is used to secure communications to the client processing system and from the data processing system.

5. The method of claim 1, wherein the second decryption key is a private key for a data encryption policy, the data encryption policy being used to secure the sensitive data, the sensitive data to be received by the client processing system.

6. The method of claim 5, wherein the second decryption key is used in an application layer of the client processing system to decrypt the partially encrypted data stream.

7. The method of claim 1, wherein the network security system does not have access to the second decryption key.

8. The method of claim 1, wherein the client processing system is configured to perform a search of the partially encrypted data stream to determine a location of at least one chunk of the sensitive data.

9. The method of claim 1, wherein the network security system is configured to screen the dual encrypted data stream for malicious data or data that does not meet security requirements of the client processing system.

10. A non-transitory machine-readable medium having instructions stored therein, which when executed by a processor, cause the processor to perform operations for managing operation of a distributed system, the operations comprising:

obtaining, by a data processing system of the distributed system, original content of a data stream;

encrypting, by the data processing system and using a first encryption key, sensitive data of the original content to obtain a partially encrypted data stream;

encrypting, by the data processing system and using a second encryption key, an entirety of the partially encrypted data stream to obtain a dual encrypted data stream such that the dual encrypted data stream comprises a first portion of chunks of data being dual encrypted and a second portion of chunks being singly encrypted;

transmitting the dual encrypted data stream to a network security system of the distributed system, the network security system having access to a first decryption key that is used to decrypt the dual encrypted data stream to obtain the partially encrypted data stream;

obtaining, by a client processing system of the distributed system and from the network security system of the distributed system, the partially encrypted data stream;

decrypting, by the client processing system and using a second decryption key, the partially encrypted data stream obtain at least one portion of the sensitive data;

regenerating, by the client processing system, a portion of the original content on which the dual encrypted data stream is based using the partially encrypted data stream and the at least one portion of the sensitive data; and providing computer implemented services using the portion of the original content.

11. The non-transitory machine-readable medium of claim 10, wherein the original content is data in an unaltered form before encryption using the first encryption key or the second encryption key.

12. A system, comprising:

a processor; and a memory coupled to the processor to store instructions, which when executed by the processor, cause the processor to perform operations for managing operation of a distributed system, the operations comprising:

obtaining, by a data processing system of the distributed system, original content of a data stream;

encrypting, by the data processing system and using a first encryption key, sensitive data of the original content to obtain a partially encrypted data stream;

encrypting, by the data processing system and using a second encryption key, an entirety of the partially encrypted data stream to obtain a dual encrypted data stream such that the dual encrypted data stream comprises a first portion of chunks of data being dual encrypted and a second portion of chunks being singly encrypted;

transmitting the dual encrypted data stream to a network security system of the distributed system, the network security system having access to a first decryption key that is used to decrypt the dual encrypted data stream to obtain the partially encrypted data stream;

obtaining, by a client processing system of the distributed system and from the network security system of the distributed system, the partially encrypted data stream;

decrypting, by the client processing system and using a second decryption key, the partially encrypted data stream obtain at least one portion of the sensitive data;

regenerating, by the client processing system, a portion of the original content on which the dual encrypted data stream is based using the partially encrypted data stream and the at least one portion of the sensitive data; and providing computer implemented services using the portion of the original content.

13. The system of claim 12, wherein the original content is data in an unaltered form before encryption using the first encryption key or the second encryption key.

14. The system of claim 12, wherein the first decryption key is a private key for a communication protocol that is used to secure communications to the client processing system and from the data processing system.

15. The system of claim 12, wherein the second decryption key is a private key for a data encryption policy, the data encryption policy being used to secure the sensitive data, the sensitive data to be received by the client processing system.

16. The system of claim 15, wherein the second decryption key is used in an application layer of the client processing system to decrypt the partially encrypted data stream.

17. The system of claim 12, wherein the network security system does not have access to the second decryption key.

18. The non-transitory machine-readable medium of claim 10, wherein the first decryption key is a private key for a communication protocol that is used to secure communications to the client processing system and from the data processing system.

19. The non-transitory machine-readable medium of claim 10, wherein the second decryption key is a private key for a data encryption policy, the data encryption policy being used to secure the sensitive data, the sensitive data to be received by the client processing system.

20. The non-transitory machine-readable medium of claim 19, wherein the second decryption key is used in an application layer of the client processing system to decrypt the partially encrypted data stream.

* * * * *